United States Patent
Shibui et al.

(10) Patent No.: US 7,834,504 B2
(45) Date of Patent: Nov. 16, 2010

(54) MOTOR ROTOR

(75) Inventors: Yasuyuki Shibui, Tokyo (JP); Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 58 days.

(21) Appl. No.: 12/303,070

(22) PCT Filed: Apr. 20, 2007

(86) PCT No.: PCT/JP2007/058595

§ 371 (c)(1),
(2), (4) Date: Dec. 1, 2008

(87) PCT Pub. No.: WO2007/145023

PCT Pub. Date: Dec. 21, 2007

(65) Prior Publication Data

US 2009/0195102 A1 Aug. 6, 2009

(30) Foreign Application Priority Data

Jun. 16, 2006 (JP) ............................. 2006-167365

(51) Int. Cl.
*H02K 21/12* (2006.01)
(52) U.S. Cl. ............................. 310/156.28; 310/156.22
(58) Field of Classification Search ............ 310/156.22, 310/156.23, 156.28, 156.29, 156.31, 261.1, 310/270
See application file for complete search history.

(56) References Cited

U.S. PATENT DOCUMENTS

| | | | | |
|---|---|---|---|---|
| 4,433,261 A | * | 2/1984 | Nashiki et al. | 310/156.28 |
| 4,543,506 A | * | 9/1985 | Kawada et al. | 310/156.59 |
| 4,625,135 A | | 11/1986 | Kasabian | |
| 4,742,259 A | * | 5/1988 | Schaefer et al. | 310/156.28 |
| 4,910,861 A | * | 3/1990 | Dohogne | 29/598 |

(Continued)

FOREIGN PATENT DOCUMENTS

JP  43-35302  5/1973

(Continued)

OTHER PUBLICATIONS

International Search Report issued in corresponding application No. PCT/JP2007/058595, completed Jul. 12, 2007 and mailed Jul. 24, 2007.

(Continued)

*Primary Examiner*—Dang D Le
(74) *Attorney, Agent, or Firm*—Griffin & Szipl, P.C.

(57) ABSTRACT

A motor rotor (22) includes a motor shaft (30), a permanent magnet (319) surrounding the motor shaft (30) around an axis, a pair of end rings (32, 32) surrounding the motor shaft (30) around the axis and sandwiching the permanent magnet (32) from both sides in an axial direction, and a hollow cylindrical outer sleeve (33) fitted to the permanent magnet (31) and a pair of end rings (32) in accordance with a stationary fit. A longitudinal elastic modulus of the end ring (32) is larger than a longitudinal elastic modulus of the permanent magnet (32). A thickness of the outer sleeve (33) is different in correspondence to a position in the axial direction in such a manner as to make uniform a circumferential stress applied to the outer sleeve (33) fitted to the permanent magnet (32) and a pair of end rings (32) in the axial direction.

3 Claims, 3 Drawing Sheets

U.S. PATENT DOCUMENTS

| | | | |
|---|---|---|---|
| 4,918,802 A | 4/1990 | Schaefer | |
| 4,933,583 A * | 6/1990 | Ripplinger | 310/156.22 |
| 4,973,872 A * | 11/1990 | Dohogne | 310/156.28 |
| 5,111,094 A * | 5/1992 | Patel et al. | 310/156.22 |
| 5,237,737 A | 8/1993 | Zigler et al. | |
| 5,563,463 A | 10/1996 | Stark | |
| 5,739,615 A * | 4/1998 | McClelland | 310/186 |
| 6,085,527 A | 7/2000 | Woollenweber et al. | |
| 6,836,954 B1 | 1/2005 | Carli et al. | |
| 7,228,615 B2 * | 6/2007 | Nilson | 29/598 |
| 7,365,465 B2 * | 4/2008 | Ludwig | 310/156.12 |
| 2003/0062787 A1 | 4/2003 | Kobayashi | |

FOREIGN PATENT DOCUMENTS

| | | |
|---|---|---|
| JP | 63-133855 | 6/1988 |
| JP | 02-231945 | 9/1990 |
| JP | 2-231945 A | 9/1990 |
| JP | 5-316671 | 11/1993 |
| JP | 05-316671 | 11/1993 |
| JP | 5-316671 A | 11/1993 |
| JP | 2000-023399 A | 1/2000 |
| JP | 2000-278898 | 10/2000 |
| JP | 2003-180058 | 6/2003 |
| JP | 2003-180058 A | 6/2003 |
| JP | 2006-141164 | 6/2006 |

OTHER PUBLICATIONS

International Search Report issued in related application No. PCT/JP2007/058949, completed May 24, 2007 and mailed Jun. 5, 2007.

Office Action issued in corresponding Korean Application No. 2008-7030541, mailed Jun. 21, 2010.

Office Action issued in corresponding Korean Patent Application No. 10-2008-7030542, dated Aug. 31, 2010.

Office Action issued in co-pending U.S. Appl. No. 12/303,076, dated Sep. 17, 2010.

Chinese Office Action issued in Chinese Application No. 200780022505.6, of co-pending U.S. Appl. No. 12/303,076, dated Sep. 9, 2010.

* cited by examiner

MOTOR ROTOR

This is a National Phase Application in the United States of International Patent Application No. PCT/JP2007/058595 filed Apr. 20, 2007, which claims priority on Japanese Patent Application No. 167365/2006, filed Jun. 16, 2006. The entire disclosures of the above patent applications are hereby incorporated by reference.

BACKGROUND OF THE INVENTION

1. Field of the Invention

The present invention relates to a motor rotor which can correspond to a circumferential speed-up of an electric motor, and more particularly to a motor rotor which is preferable for an electric motor mounted on a motor-driven supercharger.

2. Description of Related Art

In order to improve an internal combustion engine, there has been widely used a supercharger (called also as "turbocharger") driven by an exhaust gas of an internal combustion engine and compressing an intake air so as to supercharge. Further, there has been used a supercharger in which an electric motor is installed coaxially with a rotating shaft of a supercharger and an acceleration response or the like is improved by accelerating and assisting a rotational drive of a compressor. The supercharger having a motor-driven assist function by the electric motor as mentioned above is called as a motor-driven supercharger.

A description will be given briefly of a structure of this kind of motor-driven supercharger. A supercharger rotor structured such that a turbine impeller and a compressor impeller are coupled to both ends of a rotating shaft is rotatably supported within a housing. An electric motor is incorporated in the housing. A rotor (a motor rotor) of the electric motor is fixed coaxially with the rotating shaft, and a stator (a motor stator) of the electric motor is arranged in the periphery of the rotor in an inner portion of the housing. If an exhaust gas from the internal combustion engine is supplied to the turbine impeller, the turbine impeller is rotationally driven, and the compressor impeller coupled to the turbine impeller is rotationally driven, thereby compressing an intake air so as to supply to the internal combustion engine. Further, at this time, the rotational drive of the compressor impeller is assisted by the electric motor.

The motor rotor of the motor-driven supercharger mentioned above is disclosed in the following Patent Document 1. FIG. 1 is a cross sectional view showing a conventional motor rotor disclosed in the Patent document 1. The motor rotor is constituted by an inner sleeve 51 inserted and attached to a turbine shaft 50 of the supercharger, a permanent magnet 52 surrounding the inner sleeve 51 around an axis, and a hollow cylindrical outer sleeve 53 surrounding the permanent magnet 52 around the axis. The outer sleeve 53 is fitted in accordance with a shrink fitting in such a manner that it is possible to sufficiently hold the permanent magnet 52 even under a condition that a large centrifugal force acts at a maximum rotational speed of the rotor.

In a manufacturing step of the motor-driven supercharger, a correction of a rotation balance is executed by executing a rotation balance test after assembling the motor rotor. In the case of the conventional motor rotor shown in FIG. 1, the balance correction is executed by scraping a part (a portion shown by a reference symbol A in the drawing) of an end surface of the permanent magnet 52. However, if the permanent magnet 52 is scraped, a magnetic force of the permanent magnet is changed. Since an individual difference exists in the rotation balance correction amount, the magnetic force of the permanent magnet is dispersed per a product in correspondence to a scraped amount. Further, since a crack is generated and a stress becomes uneven by cutting the permanent magnet 52, strength is lowered.

In order to cope with the problem mentioned above, there has been proposed the other conventional motor rotor as shown in FIG. 2. The motor rotor is constituted by an inner sleeve 51 inserted and attached to a turbine shaft 50, a permanent magnet 52 surrounding the inner sleeve 51 around the axis, a pair of end rings 54 and 54 sandwiching the permanent magnet 52 from both sides in an axial direction, and a hollow cylindrical outer sleeve 53 surrounding the permanent magnet 52 and a pair of end rings 54 and 54 around the axis. The outer sleeve 53 is fitted to the permanent magnet 52 and the end rings 54 and 54 in accordance with a shrink fitting.

In the motor rotor having the structure mentioned above, a rotation balance correction is executed by scraping a part (a portion shown by reference symbol B in the drawing) of the end ring 54. In this case, since it is not necessary to scrape the permanent magnet 52, there is not generated a problem that the magnetic force change or the strength reduction is generated.

Patent document 1 corresponds to U.S. Pat. No. 6,085,527 (FIG. 5) discussed above.

An upper side graph in the FIG. 2 showing a distribution in an axial direction of a circumferential stress applied to the outer sleeve 53. In FIG. 2, a horizontal axis corresponds to a position in the axial direction, a vertical axis corresponds to a circumferential stress, and the distribution of a circumferential stress applied to the outer sleeve 53 makes a curve as denoted reference symbol L.

In the motor rotor shown in FIG. 2, since the end ring 54 is constituted by a material that can maintain a sufficient strength even if it is scraped at a time of correcting the rotation balance, a longitudinal elastic modulus of the end ring 54 is larger than a longitudinal elastic modulus of the permanent magnet 52. In other words, the permanent magnet 52 is comparatively softer than the end ring 54 so as to be easily deformed elastically.

Accordingly, as shown in FIG. 2, in a state in which the outer sleeve 53 is fitted to the permanent magnet 52 and the end ring 54, the circumferential stress of a portion in the outer sleeve 53 brought into contact with the end ring 54 becomes larger than that of a portion brought into contact with the permanent magnet 52. Therefore, in the outer sleeve 53, an engagement with the permanent magnet 52 becomes relatively weaker than an engagement with the end ring 54. Since further high circumferential speed is required in the electric motor in recent years, it is necessary to set the engagement between the outer sleeve 53, and the permanent magnet 52 and the end ring 54 stronger.

It is possible to set the strength of the engagement of the outer sleeve 53 in such a manner that a desired fastening force can be obtained with respect to the permanent magnet, however, if the engagement is set too strong so as to correspond to the high circumferential speed, there is a risk that both end portions of the outer sleeve 53 are plastically deformed. Accordingly, in the conventional motor rotor, there is a problem that it is hard to correspond to the further high circumferential speed.

SUMMARY OF THE INVENTION

The present invention is made by taking the problems mentioned above into consideration, and an object of the present invention is to provide a motor rotor that can correspond to a circumferential speed-up.

In order to achieve the object mentioned above, the motor rotor in accordance with the present invention employs the following means.

In other words, in accordance with the present invention, there is provided a motor rotor comprising:

a motor shaft;

a permanent magnet surrounding the motor shaft around an axis;

a pair of end rings surrounding the motor shaft around the axis and sandwiching the permanent magnet from both sides in an axial direction; and a hollow cylindrical outer sleeve fitted to the permanent magnet and the pair of end rings in accordance with a stationary fit, wherein a longitudinal elastic modulus of the end ring is larger than a longitudinal elastic modulus of the permanent magnet, a thickness of the outer sleeve is different in correspondence to a position in the axial direction in such a manner as to uniformize a circumferential stress applied to the outer sleeve fitted to the permanent magnet and a pair of end rings in the axial direction.

As mentioned above, since the thickness of the outer sleeve is different in correspondence to the position in the axial direction in such a manner as to uniformize the circumferential stress applied to the outer sleeve fitted to the permanent magnet and a pair of end rings in the axial direction, the circumferential stress applied to the outer sleeve is uniformized. In other words, in the outer sleeve, a difference of the circumferential stress is absorbed in the portion brought into contact with the permanent magnet and the portion brought into contact with the end ring. Accordingly, even if the strength of the engagement of the outer sleeve is set in such a manner that a desired fastening force can be obtained with respect to the permanent magnet, there is not generated the problem that both end portions of the outer sleeve brought into contact with the end ring are plastically deformed. Therefore, in accordance with the present invention, there can be obtained an excellent effect that it is possible to correspond to the circumferential speed-up of the electric motor.

Further, the structure may be made such that an outer diameter of a portion in the outer sleeve brought into contact with the end ring is smaller than an outer diameter of a center portion in the outer sleeve in an axial direction brought into contact with the permanent magnet.

Further, the structure may be made such that an outer diameter of the outer sleeve is reduced from the permanent magnet side toward the end ring side continuously or step by step.

It is possible to uniformize the circumferential stress applied to the outer sleeve in the axial direction, by setting the shape of the outer sleeve.

As mentioned above, in accordance with the present invention, there can be obtained an excellent effect that it is possible to correspond to the circumferential speed-up of the electric motor.

DESCRIPTION OF THE PREFERRED EMBODIMENTS

Figure 1:
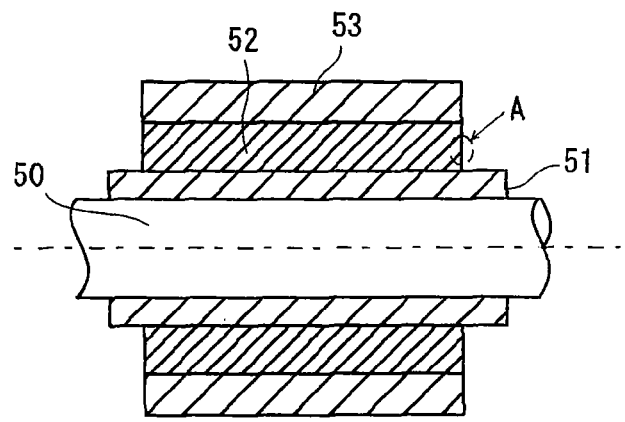
FIG. 1 is a view showing a structure of a conventional motor rotor.

A description will be in detail given below of preferable embodiments in accordance with the present invention with reference to the accompanying drawings. In this case, the same reference numerals are attached to common portions in each of the drawings, and an overlapping description will be omitted.

Figure 3:
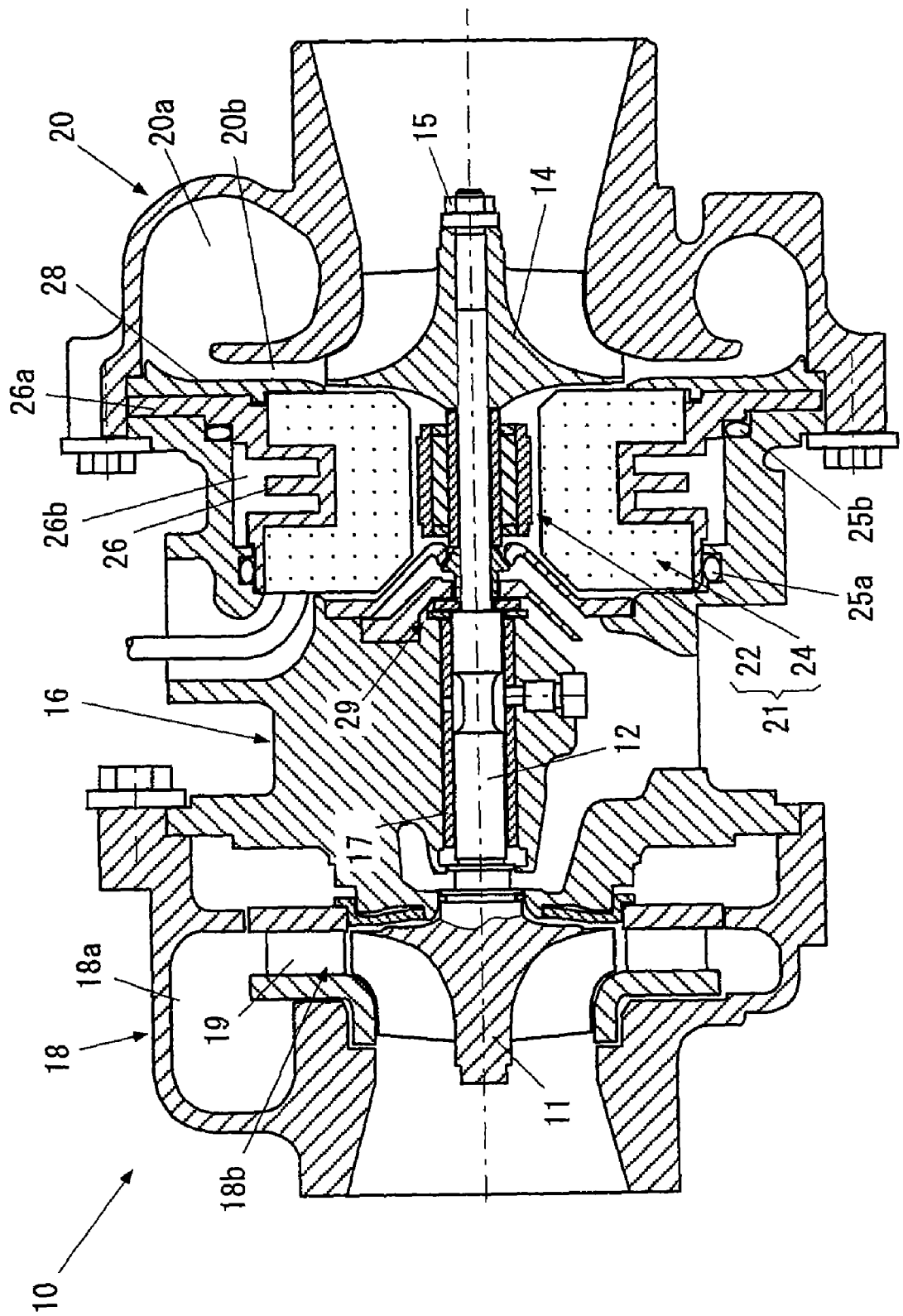
FIG. 3 is a view showing a structure of a motor-driven supercharger provided with an electric motor having a motor rotor in accordance with an embodiment of the present invention.

FIG. 3 is a view of a whole structure of a motor-driven supercharger provided with an electric motor having a motor rotor in accordance with an embodiment of the present invention. In this drawing, a motor-driven supercharger 10 is provided with a turbine shaft 12, a compressor impeller 14, an electric motor 21 and a housing. The housing is constituted by a bearing housing 16, a turbine housing 18 and a compressor housing 20, in this embodiment.

The turbine shaft 12 has a turbine impeller 11 in one end (a left end in the drawing). In this example, the turbine impeller 11 is integrally formed in the turbine shaft 12, however, the present invention is not limited to this, but may be structured such that the turbine impeller 11 is independently attached.

The compressor impeller 14 is coupled to the other end (a right end in the drawing) of the turbine shaft 12 by a shaft end nut 15 in such a manner as to be integrally rotated.

The bearing housing 16 incorporates a journal bearing 17 receiving a radial load of the turbine shaft 12, and a thrust bearing 29 receiving a thrust load, and the turbine shaft 12 is rotatably supported by the journal bearing 17 and the thrust bearing 29. Further, the bearing housing 16 has a lubricating oil flow path (not shown) for lubricating the journal bearing 17 and the thrust bearing 29.

The turbine housing 18 rotatably surrounds the turbine impeller 11, and is coupled to the bearing housing 16. An inner portion of the turbine housing 18 is provided with a scroll chamber 18a to which an exhaust gas is introduced form an external portion, and a flow path 18b guiding the exhaust gas from the scroll chamber 18a to the turbine impeller 11 and formed in an annular shape.

Further, a plurality of nozzle vanes 19 are arranged in the flow path 18b at a fixed interval in a circumferential direction. The nozzle vane 19 is constituted by a variable nozzle vane, and is preferably structured such that a flow path area formed therebetween can be changed, however, the present invention is not limited to this, but may employ a fixed nozzle vane. Further, the flow path 18b may be provided with no nozzle vane 19.

The compressor housing 20 rotatably surrounds the compressor impeller 14, and is coupled to the bearing housing 16. An inner portion of the compressor housing 20 is provided with a scroll chamber 20a to which a compressed air is introduced, and a diffuser 20b guiding the compressed air from the compressor impeller 14 to the scroll chamber 20a and formed in an annular shape.

The electric motor 21 has a motor rotor 22 and a motor stator 24. The motor rotor 22 is constituted by a rotor of the electric motor 21, and the motor stator 24 is constituted by a stator of the electric motor 21. A brushless AC motor is structured by the motor rotor 22 and the motor stator 24.

The AC motor can correspond to a high-speed rotation (for example, at least 100 to 200 thousands rpm) of the turbine shaft 12, and it is preferable that the AC motor can execute a rotational movement at a time of accelerating, and a regenerative movement at a time of decelerating. Further, it is preferable that a drive voltage of the AC motor is equal to or higher than a DC voltage of a battery mounted to a vehicle.

In the motor-driven supercharger 10 structured as mentioned above, if the exhaust gas is introduced to the scroll chamber 18*a* from the engine, the turbine impeller 11 is rotationally driven by the exhaust gas. Then, the compressor impeller 14 coupled to the turbine impeller 11 via the turbine shaft 12 is rotationally driven, and an intake air is compressed by the compressor impeller 14 so as to be supplied to the engine. Further, at this time, the rotational drive of the compressor impeller 14 is assisted by the electric motor 21.

The motor-driven supercharger 10 is provided with a flow path forming sleeve 26 and a seal plate 28. The flow path forming sleeve 26 is closely contacted with an outer circumferential surface of the motor stator 24 and an inner circumferential surface of the bearing housing 16, and constructs a water cooling jacket 26*b* with respect to the bearing housing 16. A cooling water is supplied to the water cooling jacket 26*b* from a cooling water supply port (not shown), and the cooling water is discharged from a cooling water discharge port. Seal members 25*a* and 25*b* (for example, O-rings) sealing inner and outer sides of the water cooling jacket 26*b* in a liquid tight manner are interposed between the bearing housing 16 and the flow path forming sleeve 26.

The seal plate 28 is fastened in an axial direction together with a flange portion 26*a* of the flow path forming sleeve 26 between the bearing housing 16 and the compressor housing 20. The seal plate 28 comparts between the compressor housing 20 and the motor stator 24, and is closely contacted with the compressor side of the flow path forming sleeve 26.

Figure 4:
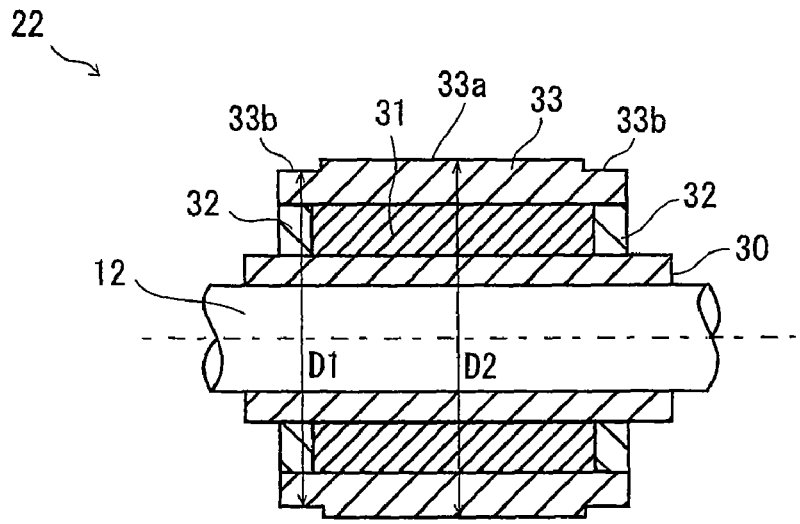
FIG. 4 is a view showing a structure of a motor rotor in accordance with an embodiment of the present invention.

FIG. 4 is an enlarged view of the motor rotor 22 shown in FIG. 3. As shown in FIG. 4, the motor rotor 22 in accordance with the present embodiment is constituted by a motor shaft 30, a permanent magnet 31 surrounding the motor shaft 30 around an axis, a pair of end rings 32 and 32 surrounding the motor shaft 30 around the axis and sandwiching the permanent magnet 31 from both sides in an axial direction, and a hollow cylindrical outer sleeve 33 surrounding the permanent magnet 31 and a pair of end rings 32 and 32 around an axis.

In the present embodiment, the motor shaft 30 is constituted by a hollow cylindrical inner sleeve inserted and attached to the turbine shaft 12, and the hollow cylindrical permanent magnet 31 and the end ring 32 are fitted to an outer periphery of the motor shaft 30 in accordance with a weak stationary fit. In this case, the motor shaft 30 is sandwiched by the other member from both sides in its axial direction so as to be integrally rotated with the turbine shaft 12.

In this case, the motor shaft 30 may be constituted by the other rotating shaft coupled coaxially to the turbine shaft 12, and in this case, it is not necessary that the motor shaft 30 is formed in the hollow cylindrical shape.

The outer sleeve 33 and the end ring 32 are made of a non-magnetic material. The outer sleeve 33 is fitted to the permanent magnet 31 and the end ring 32 in accordance with such a strong stationary fit as to apply a sufficient compression load to the permanent magnet 31 and the end ring 32 in such a manner as to prevent the permanent magnet 31 and the end ring 32 from running idle even in a condition that a great centrifugal force is applied at a maximum rotational speed of the motor rotor 22. Before shrink fitting the outer sleeve 33, an outer diameter of the permanent magnet 31 is identical with an outer diameter of the end ring 32.

In FIG. 4, a longitudinal elastic modulus of the end ring 32 is larger than a longitudinal elastic modulus of the permanent magnet 31. Accordingly, the permanent magnet 31 is comparatively softer than the end ring 32 so as to be easily elastically deformed. In the conventional motor rotor shown in FIG. 5, since the thickness and the outer diameter of the outer sleeve 53 are uniform over the whole length in the axial direction, the circumferential stress of the portion brought into contact with the end ring 54 becomes larger than that of the portion brought into contact with the permanent magnet 52.

On the contrary, in the motor rotor 22 in accordance with the present invention, as shown in FIG. 4, a thickness of the outer sleeve 33 is differentiated in correspondence to a position in an axial direction in such a manner as to uniformize a circumferential stress applied to the outer sleeve 33 fitted to the permanent magnet 31 and a pair of end rings 32. Specifically, in the outer sleeve 33, an outer diameter D1 of the portion brought into contact with the end ring 32 is smaller than an outer diameter D2 of a center portion in the axial direction brought into contact with the permanent magnet 31. In other words, the outer sleeve 33 is constituted by a large-diameter portion 33*a* and small-diameter portions 33*b* positioned in both sides of the large-diameter portion 33*a*.

Figure 2:
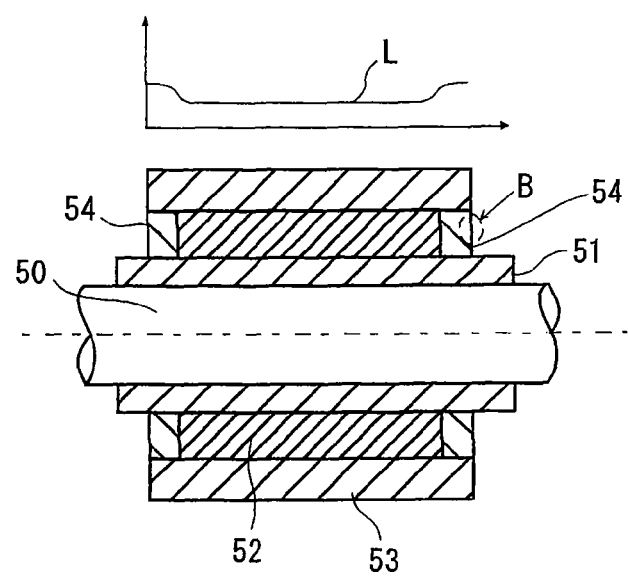
FIG. 2 is a view showing a structure of another conventional motor rotor.

In the outer sleeve 53 in the conventional motor rotor shown in FIG. 2, how much the circumferential stress of the portion brought into contact with the end ring 54 becomes larger in comparison with the circumferential stress of the portion brought into contact with the permanent magnet 52 is differentiated in correspondence to the materials of the permanent magnet 52 and the end ring 54, however, is assumed, for example, about 20 to 30% in this case. In the case that the permanent magnet 31 and the end ring 32 in the motor rotor 22 in accordance with the present embodiment are made of the same material as that of the permanent magnet 52 and the end ring 54 in FIG. 2, it is possible to absorb the difference of circumferential stress in the respective portions, by setting the outer diameters of the large-diameter portion 33*a* and the small-diameter portion 33*b* in such a manner that the thickness of the portion brought into contact with the end ring 32 in the outer sleeve 33 becomes about 20 to 30% thinner than the thickness of the portion brought into contact with the permanent magnet 31. As a result, it is possible to uniformize the circumferential stress applied to the outer sleeve 33 in the axial direction.

In this case, the term "uniformizing" does not necessarily mean only the fact that the circumferential stress of the outer sleeve 33 becomes completely uniformized in the axial direction, but includes the fact that the difference of circumferential stress is absorbed between the portion brought into contact with the permanent magnet 31 and the portion brought into contact with the end ring 32, in the outer sleeve 33. Further, the term "absorb" means the fact that the difference of circumferential stress is absorbed so as to come close to the uniform direction in comparison with the case of the outer sleeve 53 in which the thickness and the outer diameter are fixed over the whole length in the axial direction, as shown in FIG. 5.

In the outer sleeve 53 of the motor rotor shown in FIG. 2, since the circumferential stress is enlarged from the position slightly closer to the permanent magnet 52 side than the end surface in the permanent magnet 52 side of the end ring 54, a transition position from the large-diameter portion 33*a* of the outer sleeve 33 to the small-diameter portion 33*b* (in other words, a boundary portion between the large-diameter portion 33*a* and the small-diameter portion 33*b*) in accordance with the present embodiment comes to a position slightly closer to the permanent magnet 31 side than the end surface in the permanent magnet 31 side of the end ring 32. As mentioned above, it is possible to increase a uniformity of the circumferential stress by setting the transition position from the large-diameter portion 33a to the small-diameter portion 33b to a suitable position.

In accordance with the present embodiment mentioned above, since the thickness of the outer sleeve 33 is differentiated in correspondence to the position in the axial direction in such a manner as to uniformize the circumferential stress applied to the outer sleeve 33 fitted to the permanent magnet 31 and a pair of end rings 32 in the axial direction, the circumferential stress applied to the outer sleeve 33 is uniformized. In other words, in the outer sleeve 33, the difference of circumferential stress is absorbed in the portion brought into contact with the permanent magnet 31 and the portion brought into contact with the end ring 32. Accordingly, even if the stress of the engagement of the outer sleeve 33 is set in such a manner that a desired fastening force can be obtained with respect to the permanent magnet 31, there is not generated a problem that both end portions of the outer sleeve 33 brought into contact with the end ring 32 are plastically deformed. Therefore, in accordance with the present invention, there can be obtained an excellent effect that it is possible to correspond to the circumferential speed-up of the electric motor.

Figure 5:
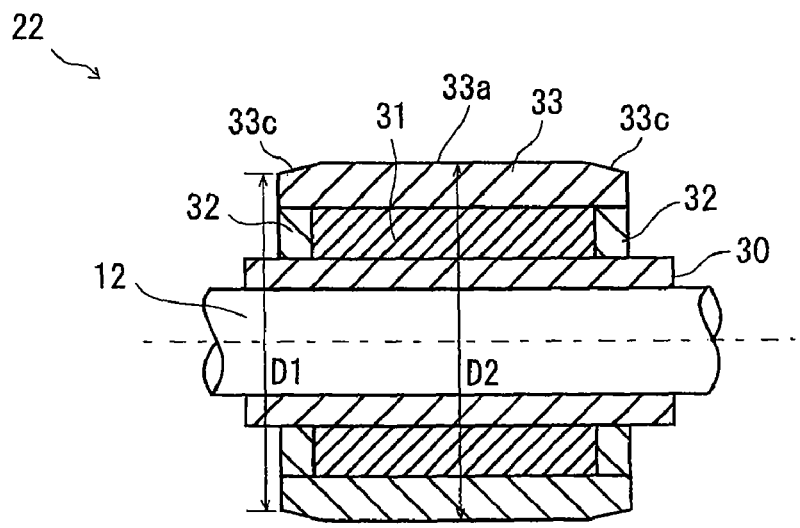
FIG. 5 is a view showing a structure of a motor rotor in accordance with another embodiment of the present invention.

FIG. 5 is a cross sectional view showing a structure of a motor rotor 22 in accordance with another embodiment of the present invention. In FIG. 5, the same reference numerals are attached to the same portions as those of FIG. 4.

In the embodiment in FIG. 4, the structure is made such that the small-diameter portion 33b is formed in the outer sleeve 33, and the outer diameter of the portion brought into contact with the end ring 32 becomes smaller than the outer diameter of the center portion in the axial direction brought into contact with the permanent magnet 31, however, the structure may be made such that the outer diameter of the outer sleeve 33 is reduced from the permanent magnet 31 side toward the end ring 32 side continuously or step by step, in place of the structure mentioned above. In the structure in which the diameter is continuously reduced as mentioned, above, the embodiment in FIG. 5 is structured such as to have a taper portion 33c in which an outer diameter is reduced toward both sides in the axial direction of the outer sleeve 33.

As shown in FIG. 2, since the circumferential stress is not changed step by step, it is possible to obtain a higher uniformizing effect by forming the taper portion 33c such as the present embodiment, than the case that the small-diameter portion 33b in FIG. 4 is formed.

As mentioned above, in the outer sleeve 53 of the motor rotor shown in FIG. 2, since the stress is enlarged from the position slightly closer to the permanent magnet 52 side than the end surface in the permanent magnet 52 side of the end ring 54, a position at which the diameter reduction of the outer sleeve 33 in the present embodiment is started (in other words, a boundary portion between the large-diameter portion 33a and the taper portion 33c) comes to a position slightly closer to the permanent magnet 31 side than the end surface in the permanent magnet 31 side of the end ring 32. As mentioned above, it is possible to increase the uniformity of the circumferential stress, by setting the diameter reduction starting position to a suitable position.

In this case, in the embodiment in FIG. 5, there is shown the example in which the diameter is reduced linearly such as the taper portion 33c, as the structure in which the outer diameter of the outer sleeve 33 is continuously reduced, however, in order to more correspond to the change of the circumferential stress shown in FIG. 2, the diameter may be reduced like a curve as the other example in which the diameter is continuously reduced. Further, the diameter reduction of the outer sleeve 33 is not limited to the continuous diameter reduction, but the diameter may be reduced step by step.

The description is given above of the embodiments in accordance with the present invention, however, the embodiments of the present invention disclosed above are shown only for exemplification, and the scope of the present invention is not limited to these embodiments in accordance with the present invention. In the embodiments mentioned above, the description is given of the example in which the present invention is applied to the motor rotor of the electric motor of the motor-driven supercharger, however, the present invention is not limited to this, but can be applied similarly to a motor rotor of an electric motor used for other devices.

The scope of the present invention is shown by the description of claims and includes all the modifications within the meaning and the range equivalent to the description of claims.

What is claimed is:

1. A motor rotor comprising:
   a motor shaft;
   a permanent magnet surrounding the motor shaft around an axis;
   a pair of end rings surrounding the motor shaft around the axis and sandwiching the permanent magnet from both sides in an axial direction; and
   a hollow cylindrical outer sleeve fitted to the permanent magnet and the pair of end rings in accordance with a stationary fit,
   wherein a longitudinal elastic modulus of the end ring is larger than a longitudinal elastic modulus of the permanent magnet, a thickness of the outer sleeve is different in correspondence to a position in the axial direction so as to make uniform a circumferential stress applied to the outer sleeve fitted to the permanent magnet and the pair of end rings in the axial direction.

2. A motor rotor as claimed in claim 1, wherein an outer diameter of a portion in the outer sleeve brought into contact with the end ring is smaller than an outer diameter of a center portion in the outer sleeve in an axial direction brought into contact with the permanent magnet.

3. A motor rotor as claimed in claim 2, wherein an outer diameter of the outer sleeve is reduced from the permanent magnet side toward the end ring side continuously or step by step.

* * * * *